US012686061B2

(12) United States Patent
Jansson et al.

(10) Patent No.: US 12,686,061 B2
(45) Date of Patent: Jul. 21, 2026

(54) CUTTING TOOL WITH A CLAMP FOR SECURING A CUTTING INSERT TO A TOOL BODY OF THE CUTTING TOOL

(71) Applicant: SECO TOOLS AB, Fagersta (SE)

(72) Inventors: Mikael Jansson, Fagersta (SE); Robin Warnander, Fagersta (SE)

(73) Assignee: Seco Tools AB, Fagersta (SE)

( * ) Notice: Subject to any disclaimer, the term of this patent is extended or adjusted under 35 U.S.C. 154(b) by 324 days.

(21) Appl. No.: 18/695,517

(22) PCT Filed: Sep. 21, 2022

(86) PCT No.: PCT/EP2022/076214
§ 371 (c)(1),
(2) Date: Mar. 26, 2024

(87) PCT Pub. No.: WO2023/046746
PCT Pub. Date: Mar. 30, 2023

(65) Prior Publication Data
US 2024/0399466 A1 Dec. 5, 2024

(30) Foreign Application Priority Data

Sep. 27, 2021 (EP) ..................................... 21199035

(51) Int. Cl.
B23B 27/16 (2006.01)
(52) U.S. Cl.
CPC ................................. B23B 27/1614 (2013.01)

(58) Field of Classification Search
CPC ..... B23C 5/2273; B23C 5/06; B23B 27/1614; B23B 27/1651; B27G 13/10; Y10T 407/1922; Y10T 407/1938
See application file for complete search history.

(56) References Cited

U.S. PATENT DOCUMENTS

| | | | |
|---|---|---|---|
| 5,558,142 A | 9/1996 | Ehrle et al. | |
| 5,857,506 A * | 1/1999 | Paolone | B23C 5/2265 |
| | | | 241/292.1 |
| 6,290,436 B1 * | 9/2001 | Qvarth | B23C 5/202 |
| | | | 407/116 |

(Continued)

FOREIGN PATENT DOCUMENTS

| | | | |
|---|---|---|---|
| EP | 2370225 B1 | 6/2015 | |
| EP | 3098007 A1 * | 11/2016 | B23C 5/2273 |

(Continued)

*Primary Examiner* — Jacob J Cigna
(74) *Attorney, Agent, or Firm* — Corinne R. Gorski

(57) ABSTRACT

A cutting tool including a tool body with an insert seat and an associated clamp pocket, a cutting insert releasably mountable in the insert seat, a clamp received in the clamp pocket and a screw that extends with play through a through hole in the clamp and is engaged in a hole at the bottom of the clamp pocket, is provided. Upon tightening of the screw, the clamp will slide against an inclined guide surface in the slide pocket via a slide surface on the clamp, which will force the clamp to move transversally to the screw shaft towards the cutting insert such that a clamp protrusion on the clamp is moved into a recess in the cutting insert and clamping surfaces on the clamp are pressed tightly against corresponding contact surfaces on the cutting insert.

15 Claims, 8 Drawing Sheets

(56)          References Cited

U.S. PATENT DOCUMENTS

| | | | | |
|---|---|---|---|---|
| 6,334,740 | B1 * | 1/2002 | Qvarth .................. | B23C 5/2278 |
| | | | | 407/46 |
| 6,789,983 | B2 * | 9/2004 | Mizutani ............... | B23C 5/2472 |
| | | | | 407/46 |
| 7,909,543 | B2 * | 3/2011 | Hayashizaki ......... | B23C 5/2269 |
| | | | | 407/41 |
| 7,997,833 | B2 * | 8/2011 | Hayashizaki ......... | B23C 5/2269 |
| | | | | 407/41 |
| 8,262,323 | B2 * | 9/2012 | Satran ....................... | B23C 5/06 |
| | | | | 407/41 |
| 8,641,330 | B2 * | 2/2014 | Jansson ................. | B23C 5/2273 |
| | | | | 407/104 |
| 9,211,590 | B2 * | 12/2015 | Morrison .................. | B23C 5/06 |
| 10,010,953 | B2 * | 7/2018 | Morrison .............. | B23C 5/2273 |
| 2015/0196959 | A1 | 7/2015 | Morrison et al. | |

FOREIGN PATENT DOCUMENTS

| | | |
|---|---|---|
| JP | S60117017 U | 8/1985 |
| JP | H09253917 A | 9/1997 |

* cited by examiner

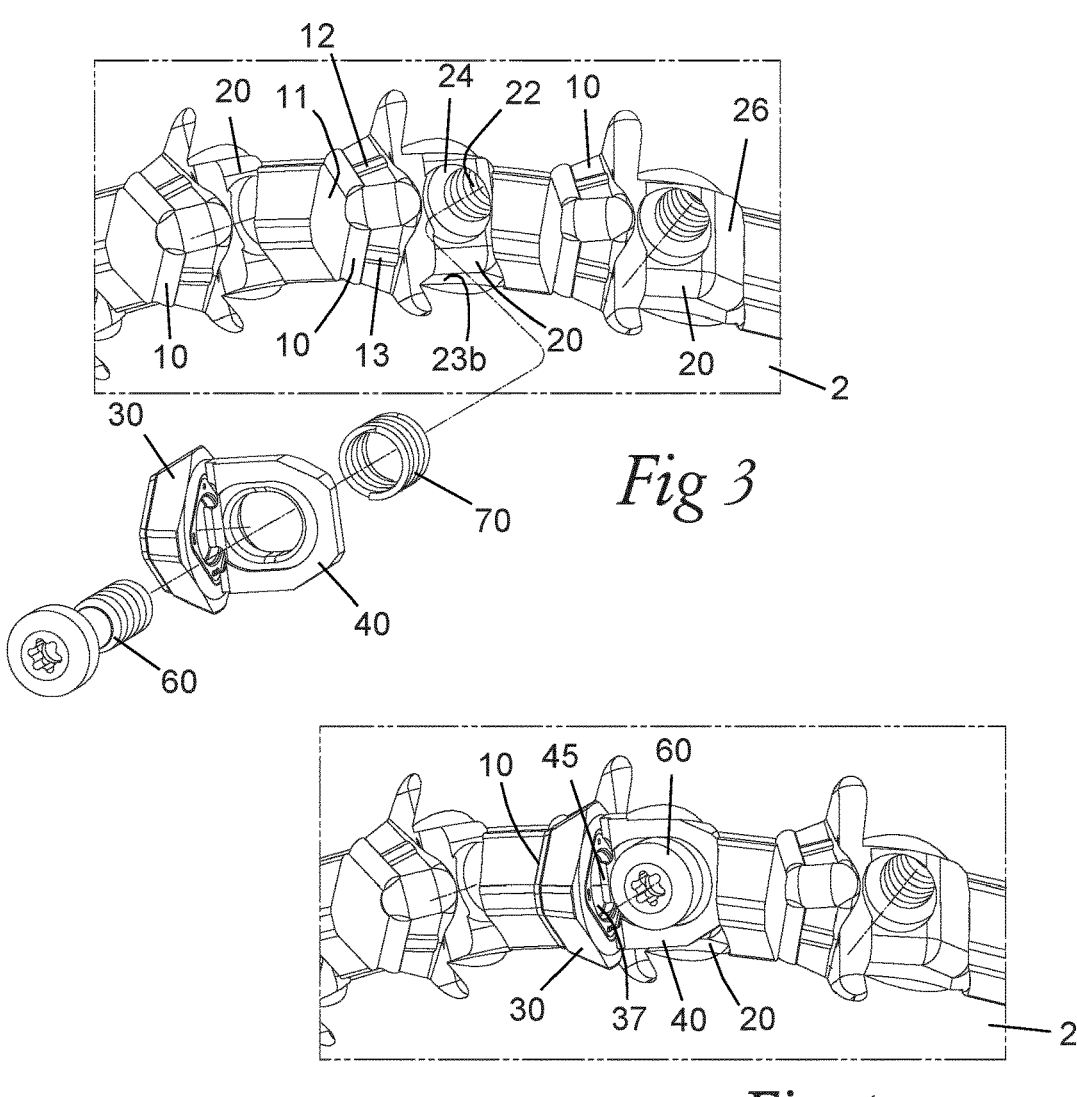
*Fig 3*
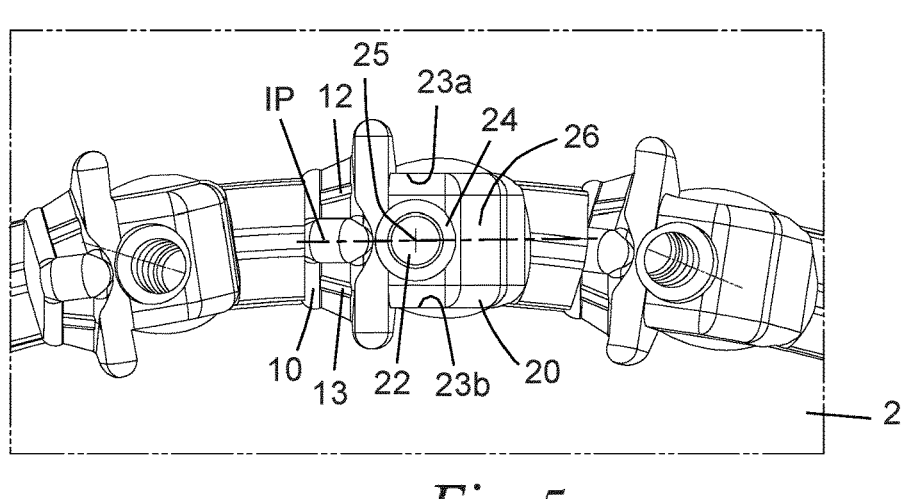
*Fig 4*
*Fig 5*

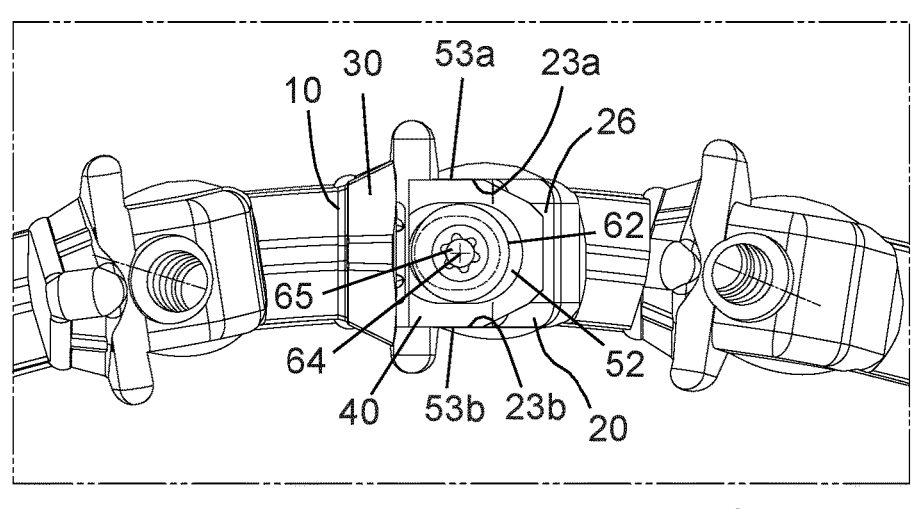
*Fig 6*
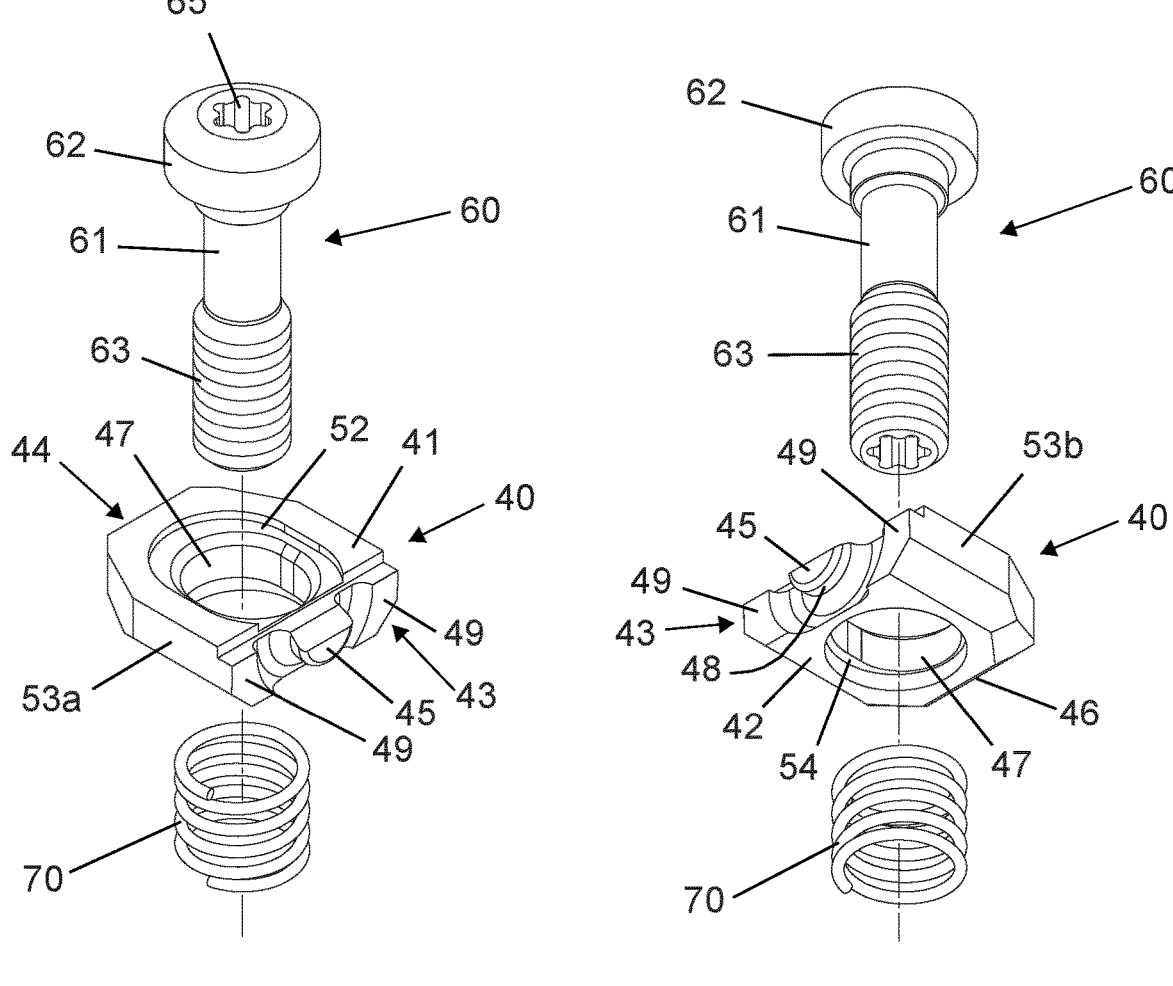
*Fig 7*
*Fig 8*

CUTTING TOOL WITH A CLAMP FOR SECURING A CUTTING INSERT TO A TOOL BODY OF THE CUTTING TOOL

RELATED APPLICATION DATA

This application is a § 371 National Stage Application of PCT International Application No. PCT/EP2022/076214 filed Sep. 21, 2022 claiming priority to EP 21199035.3 filed Sep. 27, 2021.

FIELD OF THE INVENTION AND PRIOR ART

The present invention relates to a cutting tool.

A cutting tool, for instance in the form of a milling cutter, may be provided with several cutting inserts detachably mounted in a respective insert seat in a tool body of the cutting tool. Each individual cutting insert may be provided with several identical cutting edges, to thereby allow each cutting insert to be turned into different working positions. When a cutting edge of a cutting insert has been worn out, the cutting insert may be repositioned in its insert seat and mounted in a new working position with another cutting edge in an active cutting position. Each one of the cutting inserts is releasably fixed to the associated insert seat by means of suitable fastening means. When there is sufficient space in the tool body between the insert seats, each cutting insert may be fixed to the associated insert seat by means of a fastening means in the form of a screw, which extends through a through hole in the cutting insert and is engaged in a threaded hole in a tangential support surface in the insert seat. The space required for such a screw is rather large, on the one hand due to the fact that the threaded hole in the insert seat requires a sufficient material thickness in the tool body behind the tangential support surface, and on the other hand due to the fact that there has to be left sufficient free space in the tool body in front of the cutting insert to enable insertion of the screw into the through hole in the cutting insert and to enable a torque tool to be engaged with the head of the screw. However, it is sometimes desired to mount as many cutting inserts as possible on a tool body of a given diameter and therefore minimize the space in the tool body between every two consecutive insert seats. In the latter case, it is favourable to use fastening means in the form of a clamp and an associated clamping screw, wherein the clamp has a protrusion engaged in a recess in the cutting insert and is configured to press the cutting insert towards support surfaces in the insert seat when the clamp is moved in a direction towards a rear end of the tool body under the effect of the clamping screw. Such a clamping screw may have its main extension in the axial direction of the tool body, which implies that the clamping screw and the associated threaded hole in the tool body only require a small space in the circumferential direction of the tool body at the same time as the clamping screw is easily accessible for engagement with a torque tool. An example of a cutting tool provided with such clamps and clamping screws is disclosed in EP 2 370 225 B1.

OBJECT OF THE INVENTION

The object of the present invention is to provide a cutting tool of the above-mentioned type that has a new and favourable design.

SUMMARY OF THE INVENTION

The cutting tool according to the invention comprises:
a tool body having a front end and an opposite rear end, the rear end being configured for attachment to a machine;
at least one insert seat with an associated clamp pocket provided in the tool body at the front end thereof, wherein the insert seat is configured to accommodate a cutting insert and wherein the clamp pocket is located adjacent to the insert seat and configured to accommodate a clamp, the insert seat comprising a first support surface, a second support surface arranged at an angle to the first support surface and a third support surface arranged at an angle to the first and second support surfaces;
a cutting insert releasably mountable in said at least one insert seat and comprising:
two major faces arranged on opposite sides of the cutting insert and serving as top and bottom faces of the cutting insert, wherein the cutting insert, when mounted in the insert seat, is configured to abut against the first support surface in the insert seat via one of the two major faces, and
a peripheral surface extending around the cutting insert between the two major faces, wherein the cutting insert, when mounted in the insert seat, is configured to abut against the second and third support surfaces in the insert seat via abutment faces provided on the peripheral surface; and
a clamp for releasably securing the cutting insert in said at least one insert seat, wherein the clamp is received in the clamp pocket associated with the insert seat.
The above-mentioned clamp comprises:
a lower side facing a bottom of the clamp pocket and an opposite upper side;
a first lateral side facing the insert seat and located between the upper and lower sides at a first end of the clamp;
a second lateral side facing a guide surface arranged in the clamp pocket opposite to the first support surface in the insert seat, the second lateral side being located between the upper and lower sides at an opposite second end of the clamp;
a clamp protrusion, which protrudes on the first lateral side towards the first support surface in the insert seat and which is configured to be received in a recess in one of the two major faces of the cutting insert in order to allow a first clamping surface on the clamp protrusion to come into engagement with a corresponding contact surface in the recess and press the cutting insert against the second and third support surfaces in the insert seat;
second clamping surfaces, which are provided on the first lateral side of the clamp on either side of the clamp protrusion and which are configured to abut against one of the two major faces of the cutting insert in order to press the cutting insert against the first support surface in the insert seat;
a slide surface provided on the second lateral side and facing away from the clamp protrusion, wherein the clamp is configured to abut against the guide surface in the clamp pocket via this slide surface; and
a through hole, which extends through the clamp between the upper and lower sides.
The cutting tool further comprises a screw, which extends through the through hole in the clamp and which is in threaded engagement with a hole at the bottom of the clamp pocket. This screw comprises a screw shaft and a screw head fixed to the screw shaft, wherein the screw shaft is received with play in the through hole in the clamp so as to allow the clamp to move in relation to the screw shaft towards and away from the first support surface in the insert seat transversely to the screw shaft, and wherein the screw head is configured to abut against the upper side of the clamp in order to allow the screw head to force the clamp towards the bottom of the clamp pocket upon tightening of the screw and thereby allow said first clamping surface on the clamp protrusion to be moved into engagement with the corresponding contact surface in the recess in the cutting insert. The above-mentioned guide surface in the clamp pocket is inclined in relation to the screw shaft and the first support surface in the insert seat and configured to guide the clamp in a direction towards the first support surface when the clamp is forced towards the bottom of the clamp pocket by the screw head upon tightening of the screw, to thereby allow said second clamping surfaces on the clamp to be moved into engagement with the cutting insert.

The clamping mechanism included in the cutting insert according to the present invention has such a design that the cutting insert can be releasably secured in the associated insert seat in a simple and reliable manner. When the cutting insert is to be secured in the insert seat, the screw is tightened until the slide surface on the clamp comes into contact with the inclined guide surface in the clamp pocket. Upon a further tightening of the screw, the clamp will slide on the guide surface and is thereby pressed towards the cutting insert by the guide surface at the same time as it is pressed towards the bottom of the clamp pocket by the screw head. The screw is tightened until the first and second clamping surfaces on the clamp have been pressed tightly against the cutting insert and the cutting insert has been pressed tightly against the support surfaces in the insert seat. When the clamp has reached its final position in the clamp pocket, it is efficiently and reliably clamped between the guide surface in the clamp pocket and the cutting insert. Furthermore, the inclined guide surface in the clamp pocket makes it possible to provide sufficient space in the clamp pocket to allow the cutting insert to be moved into and out of the insert seat without having to remove the clamp from the clamp pocket, i.e. when the clamp is in an upper position in the clamp pocket with the screw untightened but still in engagement with the threaded hole at the bottom of the clamp pocket.

The screw is configured to act on the clamp by the screw head pressing against a surface on the upper side of the clamp. Thus, no double threaded screw having threads running in mutually opposite directions is needed and the screw only needs to be provided with a single thread at the end of the screw shaft that faces away from the screw head, which facilitates the manufacturing of the clamping mechanism and also makes it possible to achieve a higher pressing force on the clamp from the screw as compared to the case when a double threaded screw of the type disclosed in EP 2 370 225 B1 is used. Furthermore, by having the screw configured to act on the clamp only in the axial direction of the screw via the screw head, the contact surface on the screw head and the corresponding contact surface on the upper side of the clamp can be designed as flat surfaces without any inclination, which implies low tolerance requirements for these mutual contact surfaces and reduced manufacturing costs. Furthermore, the play between the screw shaft and the through hole in the clamp makes it easy for the clamp to move transversally in relation to the screw shaft towards the first support surface in the insert seat during tightening of the screw. Thanks to this, no tight tolerances are required to be able to achieve the final clamping position, in which said first clamping surface on the clamp protrusion is in clamping engagement with the corresponding contact surface in the recess in the cutting insert and said second clamping surfaces abut against and are in clamping engagement with one of the two major faces of the cutting insert, and this final clamping position may be achieved without exposing the cutting insert, the clamp and the screw to unnecessarily high loads. When a double threaded screw of the type disclosed in EP 2 370 225 B1 is used, the cutting insert, the clamp and the screw are exposed to substantially higher loads.

The above-mentioned recess in one of the major faces of the cutting insert constitutes some type of hole of depression in the major face in question. The recess may have the form of a through hole that extends across the cutting insert between the two major faces of the cutting insert. However, the recess may as an alternative have the form of a pocket, blind hole, depression or the similar in the major face in question.

According to an embodiment of the invention, the guide surface in the clamp pocket or the slide surface on the clamp has a convex shape, as seen in a section across the clamp in parallel with an imaginary plane that extends perpendicularly to the first support surface in the insert seat and contains a centre axis of the hole at the bottom of the clamp pocket, such that the clamp is allowed to tilt in relation to the screw shaft towards the first support surface in the insert seat when the clamp is pressed towards the bottom of the clamp pocket by the screw head upon tightening of the screw. The convex shape of the slide surface and/or the guide surface makes it possible to create a single line contact between these surfaces. A single line contact makes it possible for the clamp to roll on the guide surface and to easily slide on the guide surface The ability for the clamp to tilt towards a cutting insert received in the insert seat upon tightening of the screw makes it possible to ensure, without requiring any tight tolerances, that the first and second contact surfaces on the clamp are all pressed tightly against the cutting insert.

When the guide surface in the clamp pocket has a convex shape, the slide surface on the clamp is with advantage planar, but it may as an alternative have a concave shape, as seen in the above-mentioned section, preferably with a radius of curvature that is larger than the radius of curvature of the convexly shaped guide surface, wherein the radii of curvature are measured in the area of contact between the guide surface and the slide surface.

When the slide surface on the clamp has a convex shape, the guide surface in the clamp pocket is with advantage planar, but it may as an alternative have a concave shape, as seen in the above-mentioned section, preferably with a radius of curvature that is larger than the radius of curvature of the convexly shaped slide surface, wherein the radii of curvature are measured in the area of contact between the guide surface and the slide surface.

As a further alternative, the guide surface in the clamp pocket and the slide surface on the clamp may both have a convex shape as seen in the above-mentioned section.

It is easier to achieve a convexly shaped surface on the clamp than in the clamp pocket. For manufacturing reasons, the most favourable combination is therefore a convexly shaped slide surface on the clamp and a planar or slightly concavely shaped guide surface in the clamp pocket. A convexly shaped slide surface will give the clamp a bulging design, which will give the clamp increased strength as compared to the case when the slide surface is planar or concave. The increased strength makes it possible to give the clamp smaller dimensions, which in its turn implies that the clamp will occupy a smaller space in the tool body.

According to another embodiment of the invention, the screw shaft is arranged with its centre axis extending in parallel with the first support surface in the insert seat, which consequently implies that also the associated threaded hole at the bottom of the clamp pocket has its centre axis extending in parallel with the first support surface in the insert seat. When the screw is arranged in this manner, the through hole for the screw shaft in the clamp may extend perpendicularly or substantially perpendicularly to the upper face of the clamp, which in its turn implies that the clamp and the associated clamp pocket may be given a compact design and thereby occupy a minimal space in the tool body. Thus, with this arrangement of the screw, the number of insert seats and associated clamp pockets in the tool body, and thereby the number of cutting inserts, can be maximized. Furthermore, the screw head will be easily accessible when the screw is arranged in this manner.

According to another embodiment of the invention, each one of the second clamping surfaces has a convex shape as seen in a section across the clamp in parallel with the above-mentioned imaginary plane. The convex shape of the second clamping surfaces makes it possible to create a single line contact between each one of the second clamping surfaces and the cutting insert. Hereby, the second clamping surfaces may smoothly engage with the cutting insert and a tilting motion of the clamp in relation to the cutting insert is facilitated.

According to another embodiment of the invention, the guide surface in the clamp pocket is inclined towards the first support surface in the insert seat by an angle of 30-60°, preferably 45°, in relation to a centre axis of the screw shaft. If the angle of inclination is smaller than 30°, the inclination of the guide surface is so steep that the distribution of the pressure on the cutting insert may be uneven. If the angle of inclination is larger than 60°, the inclination of the guide surface is so small that the functionality of the clamp may be jeopardized. In a case when the guide surface in the clamp pocket has a convex or concave shape, the angle of inclination of the guide surface is here considered as equivalent to the angle of inclination of a tangent to the guide surface at the contact area between the guide surface and the slide surface on the clamp.

According to another embodiment of the invention, the clamp is moveable along the screw shaft towards the bottom of the clamp pocket against the action of a spring force from a release spring. The release spring will keep the clamp in contact with the screw head also when the screw is untightened and make sure that the clamp will move upwards in the clamp pocket when the screw is untightened, which will facilitate a release of the cutting insert from the clamp when the cutting insert is to be repositioned in the insert seat in a new working position or replaced by a new cutting insert. Furthermore, by keeping the clamp in contact with the screw head, the release spring facilitates the handling of the clamp during insertion and removal of a cutting insert.

According to another embodiment of the invention, the release spring has the form of a helical compression spring, wherein the screw shaft extends through the release spring. Hereby, the release spring may be mounted to the cutting tool in a simple manner.

According to another embodiment of the invention, the release spring is fitted between a first shoulder at the bottom of the clamp pocket and an opposite second shoulder on the lower side of the clamp. Hereby, the release spring may act on the clamp in an efficient manner.

According to another embodiment of the invention, the through hole in the clamp has an oval cross-sectional shape with a major axis extending in the above-mentioned imaginary plane. This design of the through hole in the clamp is favourable with respect to the ability of the clamp to move towards and away from the cutting insert transversally to the screw shaft and the ability of the clamp to tilt in relation to the screw shaft and the cutting insert.

According to another embodiment of the invention, the length of the clamp in the above-mentioned imaginary plane is at least two times larger, preferably at least three times larger, than the thickness of the clamp. The clamp will hereby have a slender design and occupy a rather small space in the tool body.

According to another embodiment of the invention, a return spring is arranged in the clamp, wherein the clamp is moveable in relation to the screw shaft towards the first support surface in the insert seat transversally to the screw shaft against the action of a spring force from this return spring. The return spring will move the clamp away from the cutting insert when the screw is untightened, which will facilitate a release of the cutting insert from the clamp when the cutting insert is to be repositioned in the insert seat in a new working position or replaced by a new cutting insert.

According to another embodiment of the invention, the return spring has the form of a compression spring and is fitted between the screw shaft and a shoulder arranged inside the clamp between the through hole and the second end of the clamp. Hereby, the return spring may be mounted to the clamp in a simple manner and act on the clamp in an efficient manner.

According to another embodiment of the invention, the cutting tool is a milling tool. However, a cutting tool provided with fastening means of the type described above may also be another type of cutting tool, such as for instance a turning tool.

Further advantageous features of the cutting tool according to the present invention will appear from the description following below.

BRIEF DESCRIPTION OF THE DRAWINGS

With reference to the appended drawings, a specific description of embodiments of the invention cited as examples follows below. In the drawings:

FIG. 3 is an exploded perspective view of a part of the cutting tool of FIG. 1, FIG. 4 is a perspective view corresponding to FIG. 3, FIG. 5 is a perspective view of a part of the cutting tool of FIG. 1, as seen with no cutting inserts mounted in the insert seats of the tool body, FIG. 6 is a perspective view corresponding to FIG. 5, but with a cutting insert mounted in one of the insert seats, FIGS. 7 and 8 are exploded perspective views from different directions of parts included in the cutting tool of FIG. 1.

DETAILED DESCRIPTION OF EMBODIMENTS OF THE INVENTION

Figures 1, 2:
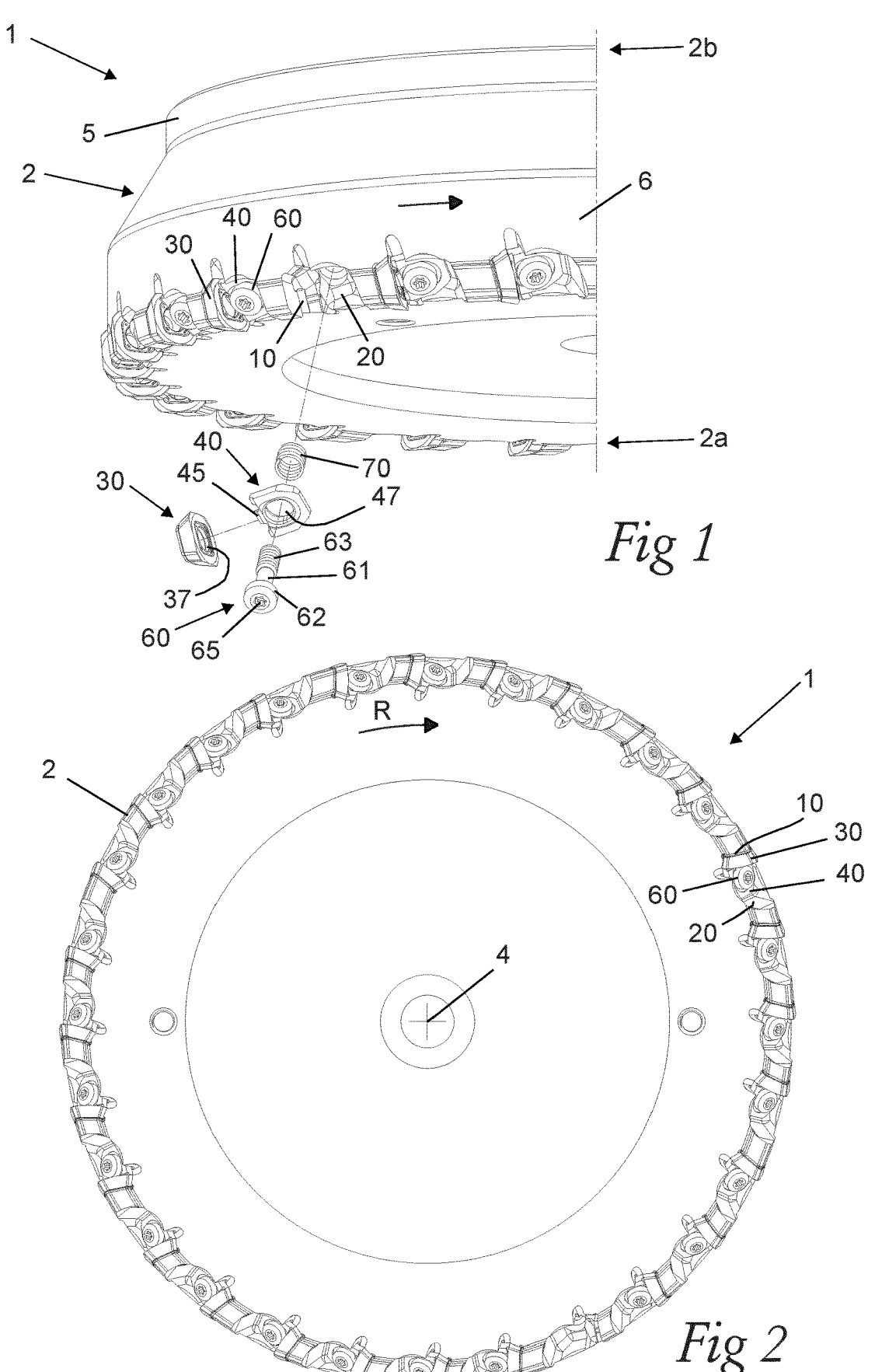
FIG. 1 is a partly exploded perspective view of a cutting tool according to an embodiment of the present invention.
FIG. 2 is a planar view of the cutting tool of FIG. 1.

A cutting tool 1 according to an embodiment of the present invention is illustrated in FIGS. 1 and 2. The cutting tool 1 comprises a tool body 2, which has a front end 2*a* and an opposite rear end 2*b*. A longitudinal axis 4 of the tool body 2 extends between the rear end 2*b* and the front end 2*a* of the tool body. A rear part of the tool body 2 forms a connection member 5, through which the tool body 2 is mountable, directly or via an intermediate tool holder, to a machine. At least one insert seat 10 with an associated clamp pocket 20 is provided in the tool body 2 at the front end 2*a* thereof, wherein the clamp pocket 20 is located adjacent to the insert seat 10. The insert seat 10 is configured to accommodate a cutting insert 30 and the clamp pocket 20 is configured to accommodate a clamp 40 that is used for releasably securing the cutting insert 30 in the insert seat 10.

In the illustrated embodiment, the cutting tool 1 has the form of a face milling cutter, wherein the tool body 2 is to be rotated about an axis of rotation that coincides with the longitudinal axis 4 of the tool body 2 and wherein the tool body is configured to be mounted to a rotating spindle or the similar of a machine, for instance in the form of a milling machine or a drilling machine. In this case, the front part 2*a* of the tool body is provided with several insert seats 10, which are evenly or at least substantially evenly distributed in the circumferential direction of the tool body 2 and configured to receive a respective cutting insert 30. However, the cutting tool may as an alternative be a non-rotating cutting tool, such as a turning tool. Furthermore, the cutting tool may be provided with one single insert seat and one single clamp pocket.

In the illustrated embodiment, the tool body 2 is provided with twenty-eight insert seats 10 spaced apart in the circumferential direction of the tool body. However, the tool body 2 may as an alternative, inter alia depending on the diameter of the tool body, be provided with any other suitable number of insert seat 10.

In the illustrated embodiment, each insert seat 10 is located at a transition between the front end 2*a* and the periphery 6 of the tool body 2, wherein each insert seat 10 is open towards the front end 2*a* of the tool body 2 in order to allow a cutting insert 30 mounted in the insert seat to project in the axial direction of the tool body 2 beyond the front end 2*a* thereof and also open towards the periphery 6 of the tool body 2 in order to allow a cutting insert 30 mounted in the insert seat to project in the radial direction of the tool body 2 beyond the periphery 6 thereof. Each clamp pocket 20 is arranged in the tool body 2 in front of the associated insert seat 10 as seen in the intended direction of rotation R of the tool body 2.

The cutting tool 1 of the present invention is provided with one or more units where each unit comprises an insert seat 10 with an adjacent clamp pocket 20, a cutting insert 30 received in the insert seat 10, a clamp 40 for releasably securing the cutting insert 30 in the insert seat 10 and a screw 60 for controlling the clamp 40. In the illustrated embodiment, the cutting tool 1 is provided with several such units of the same design. In the following, one such unit will be described in closer detail.

The insert seat 10 comprises a first support surface 11, a second support surface 12 arranged at an angle to the first support surface 11 and a third support surface 13 arranged at an angle to the first and second support surfaces 11, 12. In the illustrated embodiment, the first support surface 11 constitutes a tangential support surface of the insert seat 10.

The cutting insert 30 comprises:

two major faces 31, 32 arranged on opposite sides of the cutting insert 30 and serving as top and bottom faces thereof, wherein the cutting insert 30, when mounted in the insert seat 10, is configured to abut against the first support surface 11 in the insert seat 10 via one of the two major faces 31, 32;

a peripheral surface 33 extending around the cutting insert 30 between the two major faces 31, 32, wherein the cutting insert 30, when mounted in the insert seat 10, is configured to abut against the second and third support surfaces 12, 13 in the insert seat 10 via abutment faces 34 provided on the peripheral surface 33; and one or more cutting edges 35, 36 formed at an intersection between the peripheral surface 33 and at least one of the two major faces 31, 32.

The clamp 40 comprises:

a lower side 42 facing a bottom of the clamp pocket 20 and an opposite upper side 41;

a first lateral side 43 located between the upper and lower sides 41, 42 of the clamp 40 at a first end 40*a* of the clamp, wherein this first lateral side 43 faces the insert seat 10; and a second lateral side 44 located between the upper and lower sides 41, 42 of the clamp 40 at an opposite second end 40*b* of the clamp, wherein this second lateral side 44 faces a guide surface 26 arranged in the clamp pocket 20 opposite to the first support surface 11 in the insert seat 10;

a clamp protrusion 45, which protrudes on the first lateral side 43 towards the first support surface 11 in the insert seat 10;

a slide surface 46 provided on the second lateral side 44 and facing away from the clamp protrusion 45, wherein the clamp 40 is configured to abut against the guide surface 26 in the clamp pocket 20 via this slide surface 46; and a non-threaded through hole 47, which extends through the clamp 40 between the upper and lower sides 41, 42.

The clamp 40 is provided with a first clamping surface 48, which is provided on the clamp protrusion 45 and which faces towards the lower side 42 of the clamp. The clamp 40 is also provided with two second clamping surfaces 49, which are provided on the first lateral side 43 of the clamp on either side of the clamp protrusion 45. The clamp protrusion 45 of the clamp 40 is configured to be received in a recess 37 in one of the two major faces 31, 32 of the cutting insert 30 in order to allow said first clamping surface 48 of the clamp to come into engagement with a corresponding contact surface 38 in said recess 37 and press the cutting insert 30 against the second and third support surfaces 12, 13 in the insert seat 10. When the clamp protrusion 45 of the clamp 40 is received in the recess 37 in a major face 31 of the cutting insert 30, the above-mentioned second clamping surfaces 49 of the clamp are configured to abut against an external contact surface 39 on this major face 31 of the cutting insert on either side of the recess 37 in order to press the cutting insert 30 against the first support surface 11 in the insert seat 10. In the illustrated embodiment, said external contact surface 39 on the cutting insert 30 has the form of a flat ring-shaped surface that extends around the recess 37.

The screw 60 used for controlling the clamp 40 is received in the clamp pocket 20, wherein the screw 60 extends through the through hole 47 in the clamp 40 and is in threaded engagement with a hole 22 at the bottom of the clamp pocket 20. The screw 60 comprises a screw shaft 61 and a screw head 62 fixed to the screw shaft, wherein the screw shaft 61 is provided with an external thread 63 configured for engagement with a corresponding internal thread in the associated hole 22 at the bottom of the clamp pocket 20. The screw shaft 61 is received with play in the through hole 47 in the clamp 40 so as to allow the clamp to move in relation to the screw shaft 61 towards and away from the first support surface 11 in the adjacent insert seat 10 transversally to the screw shaft 61. The screw head 62 is configured to abut against a shoulder 52 on the upper side 41 of the clamp 40 in order to allow the screw head 62 to force the clamp 40 towards the bottom of the clamp pocket 20 upon tightening of the screw 60 and thereby allow the first clamping surface 48 of the clamp 40 to be moved into engagement with the corresponding contact surface 38 in the recess 37 of the cutting insert 30 received in the insert seat 10. The threaded hole 22 at the bottom of the clamp pocket 20 is preferably arranged with its centre axis in parallel with the first support surface 11 in the insert seat 10, such that the centre axis 64 of the screw shaft 61 will extend in parallel with this first support surface 11 when the screw shaft 61 is engaged in the associated hole 22 at the bottom of the clamp pocket 20. A socket 65 designed for releasable engagement with a torque tool (not shown) is provided on the screw head 62 so as to allow a torque tool to be connected to the screw head 62 when the screw 60 is to be rotated in order to force the clamp 40 into engagement with the cutting insert 30 or in order to release the clamp 40 from the cutting insert.

The guide surface 26 in the clamp pocket 20 is inclined in relation to the screw shaft 61 and the first support surface 11 in the insert seat 10 and configured to guide the clamp 40 in a direction towards the first support surface 11 when the clamp 40 is forced towards the bottom of the clamp pocket 20 by the screw head 62 upon tightening of the screw 60, to thereby allow said second clamping surfaces 49 of the clamp 40 to be moved into engagement with the cutting insert 30 by being pressed against the corresponding contact surface 39 on the cutting insert. The guide surface 26 is with advantage inclined towards the first support surface 11 in the insert seat 10 by an angle of 30-60°, preferably 45°, in relation to the centre axis 64 of the screw shaft 61.

Figures 9, 10, 11, 12, 13, 14, 15, 16:
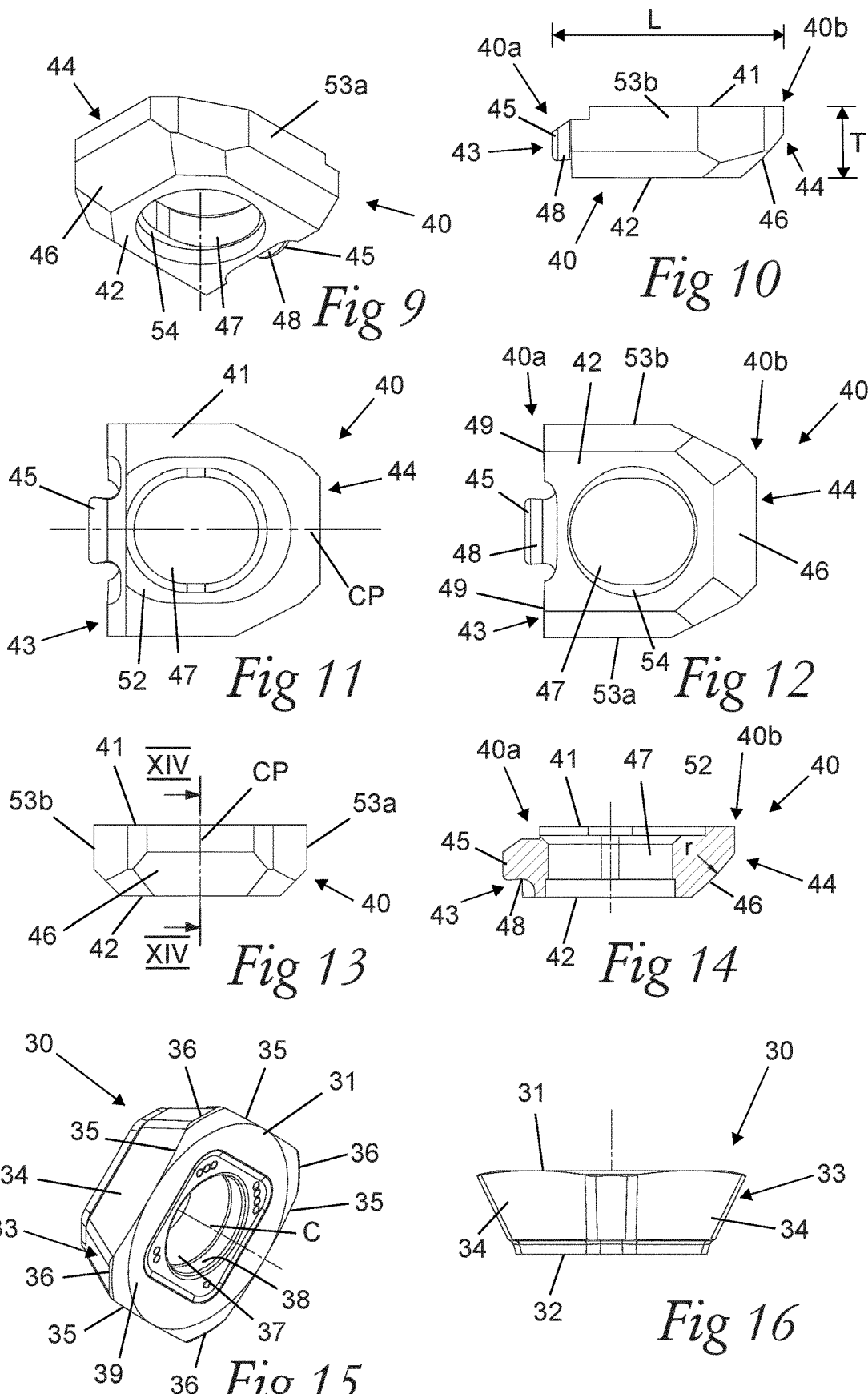
FIG. 9 is a perspective view of a clamp included in the cutting tool of FIG. 1.
FIG. 10 is a lateral view of the clamp shown in FIG. 9, FIGS. 11 and 12 are planar views from different directions of the clamp shown in FIG. 9.
FIG. 13 is an end view of the clamp shown in FIG. 9.
FIG. 14 is a cut according to the line XIV-XIV in FIG. 13.
FIG. 15 is a perspective view of a cutting insert included in the cutting tool of FIG. 1.
FIG. 16 is a lateral view of the cutting insert shown in FIG. 15, FIGS. 17 and 18 are planar views from different directions of the cutting insert shown in FIG. 15.
Figures 17, 18, 19, 20, 21:
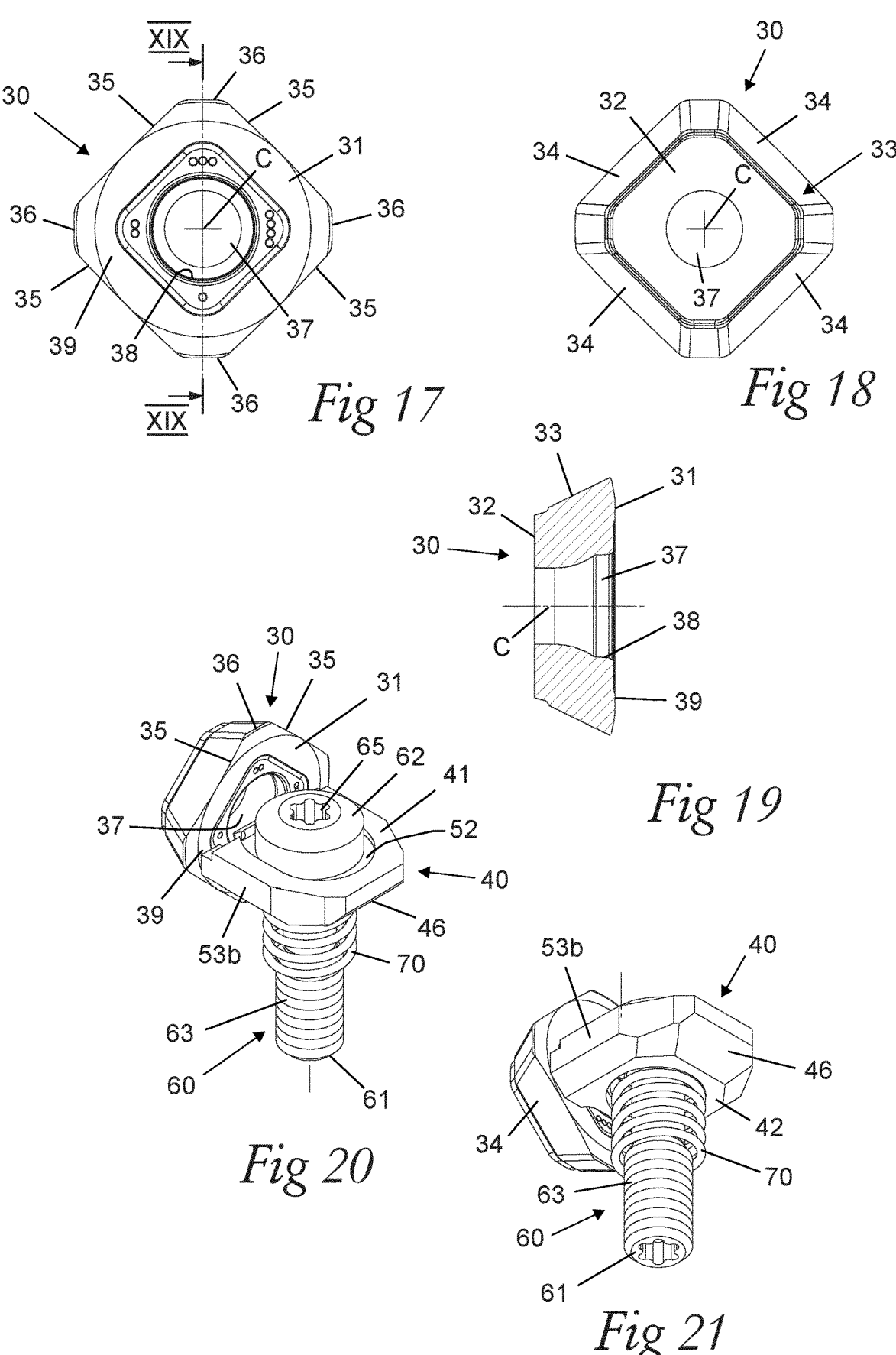
FIG. 19 is a cut according to the line XIX-XIX in FIG. 17, FIGS. 20 and 21 are perspective views from different directions of parts included in the cutting tool of FIG. 1.
Figure 22:
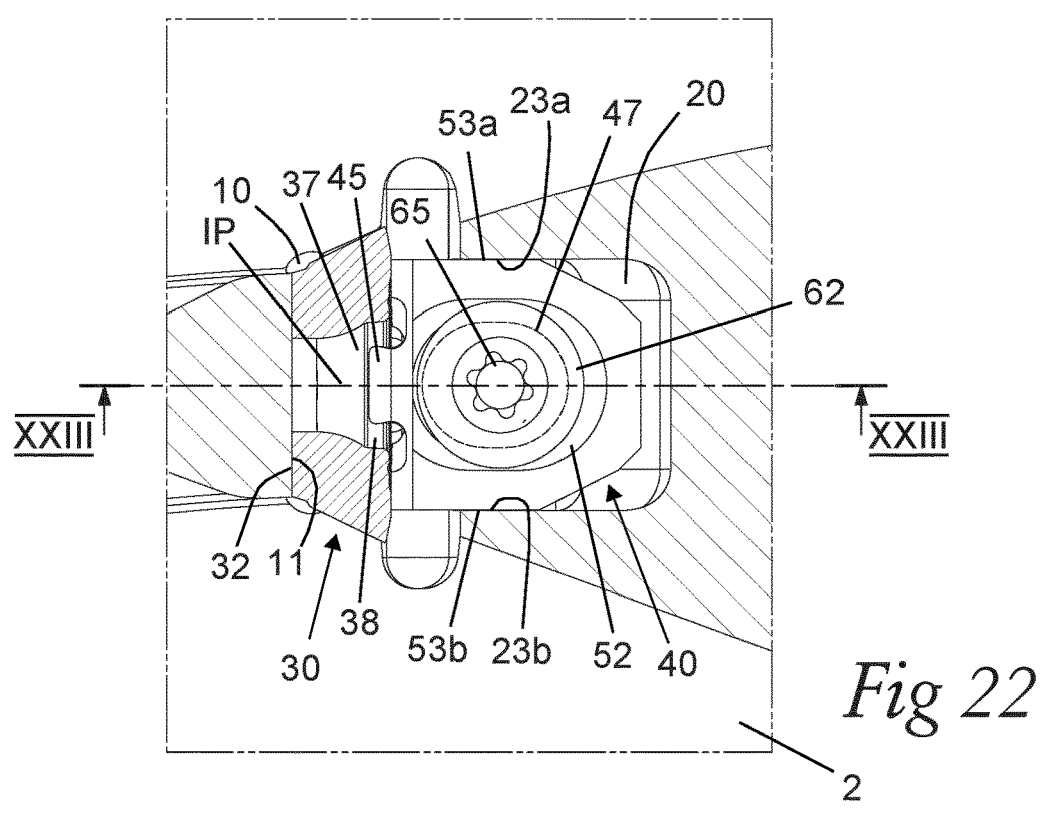
FIG. 22 is a partly cut planar view showing the parts according to FIGS. 20 and 21 mounted to a tool body.

Each one of the clamps 40 included in the cutting tool 1 illustrated in FIGS. 1-6 is of the type illustrated in closer detail in FIGS. 7-14 but may of course also be designed in any other suitable manner. The clamp 40 illustrated in FIGS. 7-14 comprises two lateral slide surfaces 53a, 53b on its periphery on opposite sides of the through hole 47, wherein these lateral slide surfaces 53a, 53b are flat and parallel to each other. The lateral slide surfaces 53a, 53b are in sliding contact with corresponding lateral guide surfaces 23a, 23b (see FIGS. 5 and 22) in the clamp pocket 20, wherein these lateral guide surfaces 23a, 23b keep the clamp 40 correctly positioned in the clamp pocket 20 and prevent the clamp from rotating in the clamp pocket about the centre axis 64 of the screw shaft 61. In the illustrated embodiment, the through hole 47 in the clamp 40 has an oval cross-sectional shape with a major axis extending in an imaginary plane IP that extends perpendicularly to the first support surface 11 in the insert seat 10 and contains a centre axis 25 of the hole 22 at the bottom of the clamp pocket 20. A cut along this imaginary plane IP is illustrated in FIG. 14. The clamp 40 is with advantage symmetrically designed, as illustrated in FIGS. 7-14, wherein a longitudinal centre plane CP of the clamp that intersects the clamp protrusion 45 and the upper and lower sides 41, 42 of the clamp will be aligned with the imaginary plane IP when the clamp 40 is properly arranged in the clamp pocket 20.

The length L of the clamp along the imaginary plane IP is with advantage at least two times larger, preferably at least three times larger, than the thickness T of the clamp, i.e. the distance between the upper and lower sides 41, 42 of the clamp.

In the illustrated embodiment, the above-mentioned first clamping surface 48 on the clamp protrusion 45 has a convex shape, as seen in a section across the clamp protrusion 45 perpendicular to the imaginary plane IP, wherein the corresponding contact surface 38 in the recess 37 of the cutting insert 30 has a concave shape with a radius of curvature that is larger than the radius of curvature of the convex first clamping surface 48 as seen in a section perpendicular to the centre axis of the recess 37, these radii of curvature being measured in the area of contact between the first clamping surface 48 and the contact surface 38.

The guide surface 26 in the clamp pocket 20 or the slide surface 46 on the clamp 40 has with advantage a convex shape, as seen in a section across the clamp 40 in parallel with the imaginary plane IP, to thereby facilitate for the clamp 40 to tilt in relation to the screw shaft 61 towards the first support surface 11 in the insert seat 10 when the clamp 40 is pressed towards the bottom of the clamp pocket 20 by the screw head 62 upon tightening of the screw 60. In the illustrated embodiment, the slide surface 46 on the clamp 40 has a convex shape, whereas the guide surface 26 in the clamp pocket 20 is planar. However, when the slide surface 46 on the clamp 40 has a convex shape, the guide surface 26 in the clamp pocket 20 may as an alternative be slightly concave, as seen in a section across the clamp pocket 20 in parallel with the imaginary plane IP, preferably with a radius of curvature that is larger than the radius of curvature r (see FIG. 14) of the convex slide surface 46. In the latter case, the radii of curvature are measured in the area of contact between the guide surface 26 and the slide surface 46. When the slide surface 46 on the clamp 40 has a convex shape, the guide surface 26 in the clamp pocket 20 may as a further alternative also be slightly convex as seen in a section across the clamp pocket 20 in parallel with the imaginary plane IP.

When the guide surface 26 in the clamp pocket 20 has a convex shape as seen in the above-mentioned section, the slide surface 46 on the clamp 40 may, as mentioned above, be convex. When the guide surface 26 in the clamp pocket 20 has a convex shape, the slide surface 46 on the clamp 40 may as an alternative be planar or have a concave shape, preferably with a radius of curvature that is larger than the radius of curvature of the convex guide surface 26. In the latter case, the radii of curvature are measured in the area of contact between the guide surface 26 and the slide surface 46.

Furthermore, each one of the second clamping surfaces 49 on the clamp 40 has with advantage a convex shape, as seen in a section across the clamp 40 in parallel with the imaginary plane IP, to thereby facilitate for the clamp 40 to tilt in relation to the screw shaft 61 towards the first support surface 11 in the insert seat 10 when the clamp 40 is pressed towards the bottom of the clamp pocket 20 by the screw head 62 upon tightening of the screw 60.

Figure 23A:
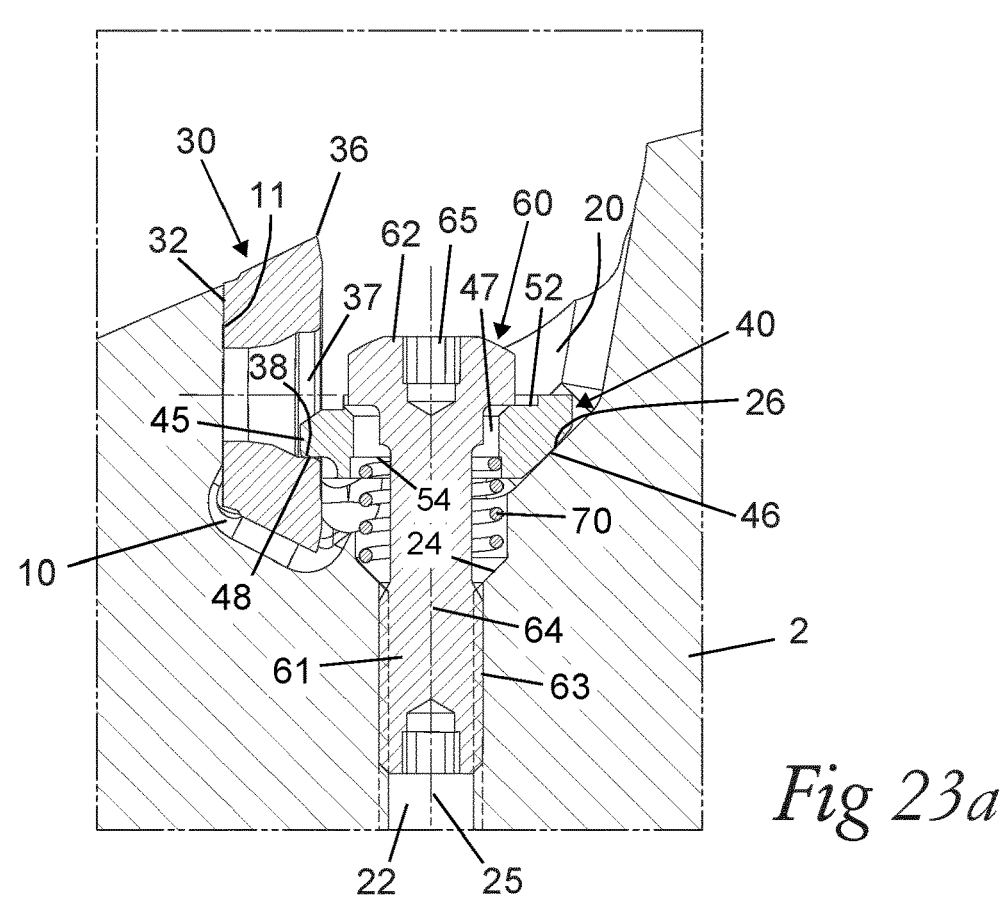
FIG. 23*a* is a cut according to the line XXIII-XXIII in FIG. 22, FIGS. 23*b* and 23*c* are cuts corresponding to FIG. 23*a*, illustrating different stages during the release of a cutting insert from the tool body.
Figure 23B:
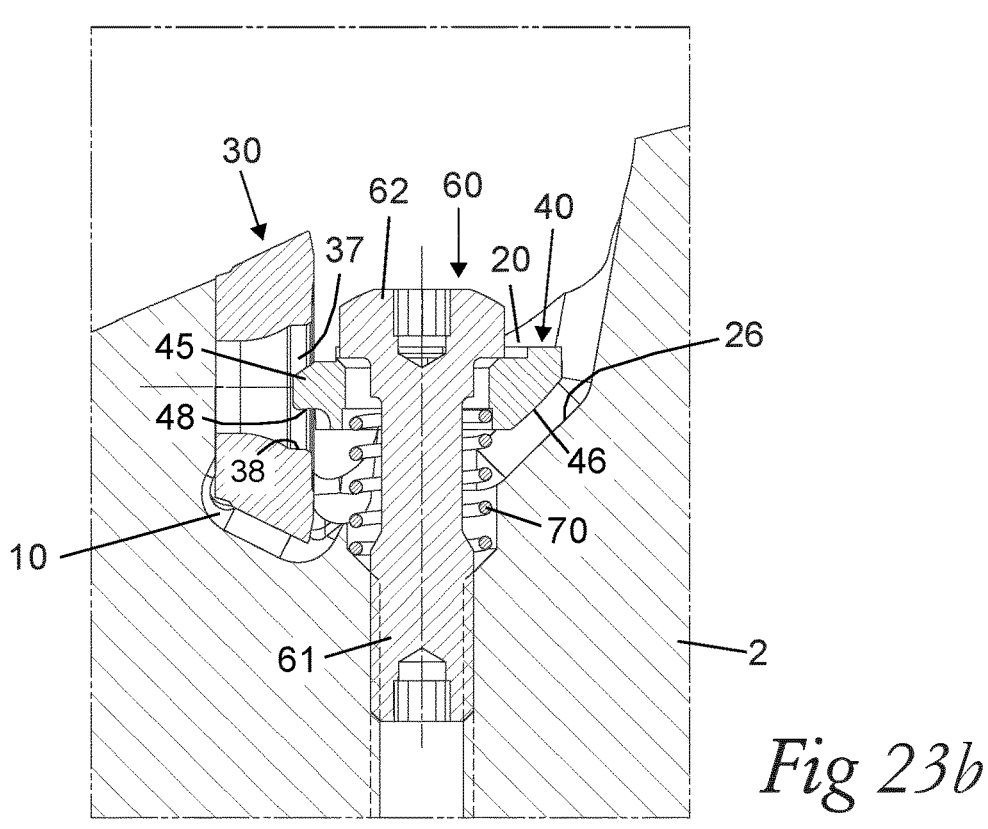
Figure 23C:
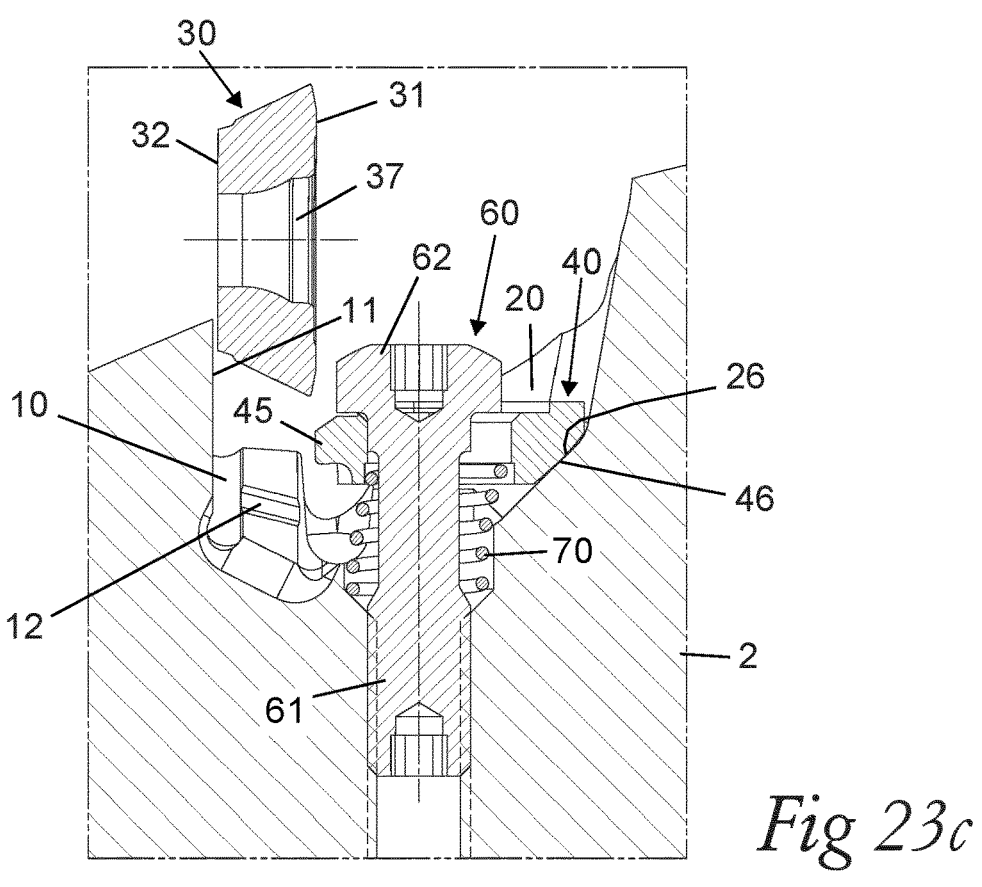

Each one of the above-mentioned units is with advantage provided with a release spring 70, which is arranged in the clamp pocket 20 and configured to act on the clamp 40 in such a manner that the clamp is moveable along the screw shaft 61 towards the bottom of the clamp pocket 20 against the action of a spring force from the release spring 70. Thus, the release spring 70 will urge the clamp 40 upwards in the clamp pocket 20 and keep the clamp 40 pressed against the screw head 62. When the screw 60 is untightened and the screw head 62 moves upwards in the clamp pocket 20, the clamp 40 will move upwards in the clamp pocket 20 under the effect of the spring force from the release spring 70 and thereby follow the upward movement of the screw head 62. When the clamp 40 moves upwards in the clamp pocket 20 under the effect of the spring force from the release spring 70, the clamp protrusion 45 will move upwards in relation to the cutting insert 30 and the first contact surface 48 on the clamp protrusion will be disengaged from the corresponding contact surface 38 in the recess 37 of the cutting insert. In the illustrated embodiment, the release spring 70 has the form of a helical compression spring arranged around the screw shaft 61. Thus, in this case, the screw shaft 61 extends through the release spring 70. The release spring 70 may be fitted between a first shoulder 24 at the bottom of the clamp pocket 20 and an opposite second shoulder 54 on the lower side 42 of the clamp 40, as illustrated in FIGS. 23a-23c.

Figure 24A:
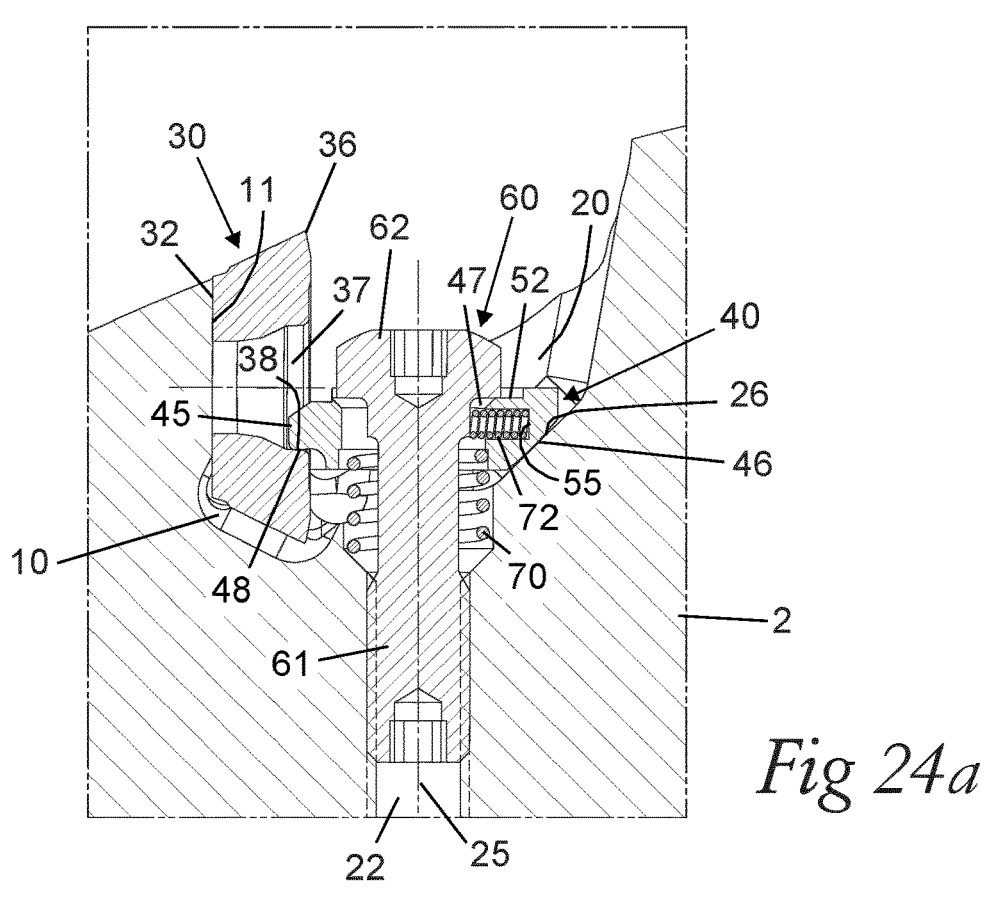
FIGS. 24*a* and 24*b* are cuts corresponding to FIGS. 23*a* and 23*c*, with a return spring provided in the clamp.
Figure 24B:
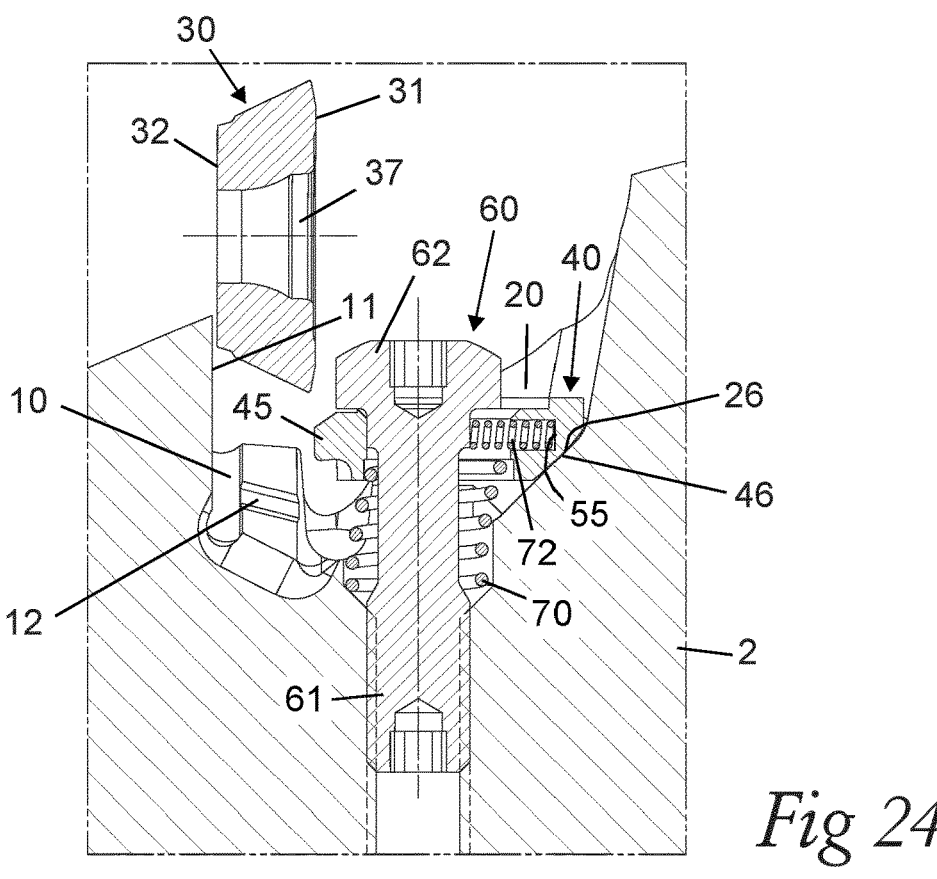

In the embodiment illustrated in FIGS. 24a and 24b, a return spring 72 is arranged in the clamp 40, wherein the clamp 40 is moveable in relation to the screw shaft 61 towards the first support surface 11 in the insert seat 10 transversally to the screw shaft 61 against the action of a spring force from this return spring 72. Thus, the return spring 72 will urge the clamp 40 away from the first support surface 11 in the insert seat 10 and towards the guide surface 26 in the clamp pocket 20 in a direction perpendicular to the screw shaft 61. When the screw 60 is untightened and the clamp 40 moves upwards in the clamp pocket 20 under the effect of the spring force from the release spring 70, the return spring 72 will push the clamp 40 away from the cutting insert 30 such that the clamp protrusion 45 is moved out of the recess 37 in the cutting insert 30, which will facilitate a removal of the cutting insert from the insert seat 10. In the illustrated embodiment, the return spring 72 has the form of a helical compression spring and is fitted in a space inside the clamp 40 between the screw shaft 61 and a shoulder 55 arranged inside the clamp between the through hole 47 and the second end 40b of the clamp.

Each one of the cutting inserts 30 included in the cutting tool 1 illustrated in FIGS. 1-6 is of the type illustrated in closer detail in FIGS. 15-19 but may of course also be designed in any other suitable manner. The cutting insert 30 illustrated in FIGS. 15-19 has a polygonal basic shape and is turnable into four different working positions, wherein a centre axis C of the cutting insert 30 coincides with the centre axis of the above-mentioned recess 37. In the illustrated embodiment, the recess 37 has the form of a through hole that extends between the two major faces 31, 32 of the cutting insert 30. However, the recess 37 may as an alternative be designed as a blind hole or depression in the major face 31 that faces away from the first support surface 11 in the insert seat 10. The illustrated cutting insert 30 is a single-sided cutting insert with cutting edges 35, 36 arranged only along the periphery of one major face 31. In this case, the major face 31 provided with the cutting edges 35, 36 are configured to face away from the first support surface 11 in the insert seat 10 when the cutting insert 30 is mounted in the insert seat 10, whereas the opposite major face 32 is configured to abut against the first support surface 11 in the insert seat 10 when the cutting insert 30 is mounted in the insert seat 10. However, a cutting tool 1 according to the present invention may as an alternative be provided with double-sided cutting inserts with cutting edges arranged along the periphery of both major faces 31, 32.

When a cutting insert 30 is to be mounted and secured in an insert seat 10, the screw head 62 and the clamp 40 provided in the adjacent clamp pocket 20 is to be in an upper position in the clamp pocket 20. By moving the clamp 40 as long as possible away from the first support surface 11 in the insert seat 10 when in this upper position, there will be sufficient free space between the clamp protrusion 45 and the first support surface 11 to allow the cutting insert 30 to be moved into the insert seat 10 and positioned with two of its abutment faces 34 abutting against a respective one of the second and third support surfaces 12, 13 in the insert seat 10 and with a major face 32 abutting against the first support surface 11 in the insert seat. When the cutting insert 30 has been properly positioned in the insert seat 10, the screw 60 is rotated in a first rotary direction by means of a torque tool in order to tighten the screw 60 and thereby move the clamp 40 downwards in the clamp pocket 20 towards the bottom thereof under the effect of the screw head 62 and against the action of a spring force from the release spring 70. When the clamp 40 is moved towards the bottom of the clamp pocket 20, the clamp 40 will slide against the guide surface 26 in the clamp pocket via the slide surface 46 on the clamp, wherein the guide surface 26 will force the clamp 40 to move transversally to the screw shaft 61 towards the first support surface 11 in the insert seat 10 such that the clamp protrusion 45 is pushed into the recess 37 in the cutting insert 30 until the second clamping surfaces 49 on the clamp 40 makes contact with the corresponding external contact surface 39 on the cutting insert. Upon further tightening of the screw 60, the screw head 62 will effect a tilting of the clamp 40 such that the first clamping surface 48 on the clamp protrusion 45 is pressed against the corresponding contact surface 38 in the recess 37 of the cutting insert 30 at the same time as the second clamping surfaces 49 on the clamp are pressed tightly against the corresponding external contact surface 39 on the cutting insert. The screw 60 and the clamp 40 will hereby ensure that the cutting insert 30 is pressed tightly against the associated support surfaces 11, 12, 13 in the insert seat 10 and maintained properly positioned in the insert seat 10. Depending on the tolerances, the first clamping surface 48 on the clamp protrusion 45 may, during tightening of the screw 60, be pressed tightly against the corresponding contact surface 38 in the recess 37 of the cutting insert 30 before or after the moment when second clamping surfaces 49 on the clamp are pressed tightly against the corresponding external contact surface 39 on the cutting insert. In the first case, the cutting insert 30 is first clamped between the clamp protrusion 45 and the second and third support surfaces 12, 13 in the insert seat 10, whereupon the clamp 40 will tilt about the point or line of contact between the first clamping surface 48 on the clamp protrusion 45 and the corresponding contact surface 38 in the recess 37 of the cutting insert 30 during further tightening of the screw 60 such that the second end 40*b* of the clamp 40 will be pressed further downwards along the guide surface 26 in the clamp pocket 20, which will cause the second clamping surfaces 49 on the clamp to be pressed tightly against the corresponding external contact surface 39 on the cutting insert. In the other case, the cutting insert 30 is first clamped between the second clamping surfaces 49 on the clamp and the first support surface 11 in the insert seat 10, whereupon the clamp 40 will tilt about the point or line of contact between the slide surface 46 on the clamp and the guide surface 26 in the clamp pocket during further tightening of the screw 60 such that the first end 40*a* of the clamp 40 will be pressed further downwards in the clamp pocket 20, which will cause the first clamping surface 48 on the clamp protrusion 45 to be pressed tightly against the corresponding contact surface 38 in the recess 37 of the cutting insert 30.

When the cutting insert 30 is to be removed from or repositioned in the insert seat 10, the screw 60 is rotated by means of a torque tool in a second rotary direction, opposite to the above-mentioned first rotary direction, in order to untighten the screw 60 and thereby allow the clamp 40 to move upwards in the clamp pocket 20 away from the bottom of the clamp pocket under the effect of the release spring 70 from the position illustrated in FIG. 23*a* to the position illustrated in FIG. 23*b*. The first contact surface 48 on the clamp protrusion 45 is hereby disengaged from the corresponding contact surface 38 in the recess 37 of the cutting insert 30. When the clamp 40 has reached an upper position in the clamp pocket 20, the clamp 40 may be pushed away from the cutting insert 30, for instance by means of a suitable tool, in order to provide free space for the cutting insert 30 to be moved out of the insert seat 10, whereupon the cutting insert 30 may be turned and returned into the insert seat in a new working position or replaced by a new cutting insert.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A cutting tool comprising:
a tool body having a front end and an opposite rear end, the rear end being configured for attachment to a machine;
at least one insert seat with an associated clamp pocket provided in the tool body at the front end thereof, wherein the insert seat is configured to accommodate a cutting insert and wherein the clamp pocket is located adjacent to the insert seat and configured to accommodate a clamp, the insert seat including a first support surface, a second support surface arranged at an angle to the first support surface and a third support surface arranged at an angle to the first and second support surfaces;
the cutting insert being releasably mountable in said at least one insert seat, wherein the cutting insert comprises:
two major faces arranged on opposite sides of the cutting insert and serving as top and bottom faces of the cutting insert, wherein the cutting insert, when mounted in the insert seat, is configured to abut against the first support surface in the insert seat via one of the two major faces, and
a peripheral surface extending around the cutting insert between the two major faces, wherein the cutting insert, when mounted in the insert seat, is configured to abut against the second and third support surfaces in the insert seat via abutment faces provided on the peripheral surface;
the clamp for releasably securing the cutting insert in said at least one insert seat, being received in the clamp pocket associated with the insert seat, the clamp comprising:
a lower side facing a bottom of the clamp pocket and an opposite upper side,
a first lateral side facing the insert seat and located between the upper and lower sides at a first end of the clamp,
a second lateral side facing a guide surface arranged in the clamp pocket opposite to the first support surface (11) in the insert seat, the second lateral side being located between the upper and lower sides at an opposite second end of the clamp,
a clamp protrusion, which protrudes on the first lateral side towards the first support surface in the insert seat and which is configured to be received in a recess in one of the two major faces of the cutting insert in order to allow a first clamping surface on the clamp protrusion to come into engagement with a corresponding contact surface in the recess and press the cutting insert against the second and third support surfaces in the insert seat,
a slide surface provided on the second lateral side and facing away from the clamp protrusion, wherein the clamp is configured to abut against the guide surface in the clamp pocket via this slide surface, and
a through hole, which extends through the clamp between the upper and lower sides;
a screw, which extends through the through hole in the clamp and which is in threaded engagement with a hole at the bottom of the clamp pocket (20); and
second clamping surfaces, which are provided on the first lateral side of the clamp on either side of the clamp protrusion, the second clamping surfaces being configured to abut against one of the two major faces of the cutting insert in order to press the cutting insert against the first support surface in the insert seat, wherein the screw includes a screw shaft and a screw head fixed to the screw shaft, wherein the screw shaft is received with play in the through hole in the clamp so as to allow the clamp to move in relation to the screw shaft towards and away from the first support surface in the insert seat transversally to the screw shaft, and wherein the screw head is configured to abut against the upper side of the clamp in order to allow the screw head to force the clamp towards the bottom of the clamp pocket upon tightening of the screw and thereby allow said first clamping surface to be moved into engagement with the corresponding contact surface in said recess; and
wherein the guide surface in the clamp pocket is inclined in relation to the screw shaft and the first support surface in the insert seat and configured to guide the clamp in a direction towards the first support surface when the clamp is forced towards the bottom of the clamp pocket by the screw head upon tightening of the screw to thereby allow said second clamping surfaces to be moved into engagement with the cutting insert.

2. The cutting tool according to claim 1, wherein the guide surface in the clamp pocket or the slide surface on the clamp has a convex shape, as seen in a section across the clamp in parallel with an imaginary plane that extends perpendicularly to the first support surface in the insert seat and contains a centre axis of the hole at the bottom of the clamp pocket, such that the clamp is allowed to tilt in relation to the screw shaft towards the first support surface in the insert seat when the clamp is pressed towards the bottom of the clamp pocket by the screw head upon tightening of the screw.

3. The cutting tool according to claim 2, wherein the guide surface in the clamp pocket has a convex shape, and wherein the slide surface on the clamp is planar or has a concave shape.

4. The cutting tool according to claim 2, wherein the slide surface on the clamp has a convex shape, and wherein the guide surface in the clamp pocket is planar or has a concave shape.

5. The cutting tool according to claim 1, wherein a centre axis of the screw shaft extends in parallel with the first support surface in the insert seat.

6. The cutting tool according to claim 1, wherein each the second clamping surfaces has a convex shape as seen in a section across the clamp in parallel with an imaginary plane that extends perpendicularly to the first support surface in the insert seat and contains a centre axis of the hole at the bottom of the clamp pocket.

7. The cutting tool according to claim 1, wherein the guide surface in the clamp pocket is inclined towards the first support surface in the insert seat by an angle of 30-60°, in relation to a centre axis of the screw shaft.

8. The cutting tool according to claim 1, wherein the clamp is moveable along the screw shaft towards the bottom of the clamp pocket against the action of a spring force from a release spring.

9. The cutting tool according to claim 8, wherein the release spring has the form of a helical compression spring, wherein the screw shaft extends through the release spring.

10. The cutting tool according to claim 8, wherein the release spring is fitted between a first shoulder at the bottom of the clamp pocket and an opposite second shoulder on the lower side of the clamp.

11. The cutting tool according to claim 1, wherein the through hole in the clamp has an oval cross-sectional shape with a major axis extending in an imaginary plane that extends perpendicularly to the first support surface in the insert seat and contains a centre axis of the hole at the bottom of the clamp pocket.

12. The cutting tool according to claim 1, wherein the length of the clamp in an imaginary plane that extends perpendicularly to the first support surface in the insert seat and contains a centre axis of the hole at the bottom of the clamp pocket is at least two times larger than a thickness of the clamp.

13. The cutting tool according to claim 1, wherein a return spring is arranged in the clamp, wherein the clamp is moveable in relation to the screw shaft towards the first support surface in the insert seat transversally to the screw shaft against the action of a spring force from this return spring.

14. The cutting tool according to claim 13, wherein the return spring has the form of a compression spring and is fitted between the screw shaft and a shoulder arranged inside the clamp-between the through hole and the second end of the clamp.

15. The cutting tool according to claim 1, wherein the cutting tool is a milling tool.

* * * * *